US009130977B2

(12) United States Patent  
Zisapel et al.

(10) Patent No.: US 9,130,977 B2  
(45) Date of Patent: Sep. 8, 2015

(54) TECHNIQUES FOR SEPARATING THE PROCESSING OF CLIENTS' TRAFFIC TO DIFFERENT ZONES

(71) Applicant: Radware, Ltd., Tel Aviv (IL)

(72) Inventors: Yehuda Zisapel, Tel Aviv (IL); Avi Chesla, Tel Aviv (IL); Shay Naeh, Tel Aviv (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 13/744,030

(22) Filed: Jan. 17, 2013

(65) Prior Publication Data

US 2013/0283373 A1    Oct. 24, 2013

Related U.S. Application Data

(60) Provisional application No. 61/625,872, filed on Apr. 18, 2012.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC ........ *H04L 63/1408* (2013.01); *H04L 63/1441* (2013.01)

(58) Field of Classification Search
CPC ........................... H04L 63/14–63/1491; H04L 41/5019–41/5025
USPC ..................................................... 726/22–25
See application file for complete search history.

(56) References Cited

U.S. PATENT DOCUMENTS

| 7,272,115 | B2 * | 9/2007 | Maher et al. ................. 709/224 |
| 7,530,106 | B1 * | 5/2009 | Zaitsev et al. .................... 726/24 |
| 7,733,891 | B2 * | 6/2010 | Reynolds et al. ............. 370/412 |
| 7,882,556 | B2 * | 2/2011 | Ahn et al. ........................ 726/13 |
| 8,051,481 | B2 * | 11/2011 | Baldonado et al. ............. 726/22 |
| 8,225,400 | B2 * | 7/2012 | Pacella et al. ................... 726/23 |
| 8,503,307 | B2 * | 8/2013 | Tourrilhes et al. ............. 709/224 |
| 8,751,627 | B2 * | 6/2014 | Liu et al. ........................ 709/224 |

(Continued)

OTHER PUBLICATIONS

Scalable Cloud Defenses for Detection, Analysis and Mitigation of DDoS Attacks Joseph Latanicki, Philippe Massonet, Syed Naqvi, Benny Rochwerger, and Massimo Villari 2010.*

(Continued)

*Primary Examiner* — Christopher Revak  
*Assistant Examiner* — Vadim Savenkov  
(74) *Attorney, Agent, or Firm* — M&B IP Analysts, LLC

(57) ABSTRACT

A system and method for separation of traffic processing in a computing farm. The method comprises allocating a first group of computing resources of the computing farm to a trusted zone and a second group of computing resources to an un-trusted zone, wherein the computing resources in the first group are allocated to ensure at least service-level agreements (SLA) guaranteed to a group of trusted clients; determining, based on a plurality of security risk indication parameters, if a client associated with an incoming traffic is a trusted client or an un-trusted client; forwarding the incoming traffic to the second group of computing resources when the client is determined to be an un-trusted client; and diverting the incoming traffic to the first group of computing resources when the client is determined to be a trusted client, thereby ensuring at least the SLA guaranteed to the trusted client.

25 Claims, 4 Drawing Sheets

(56) References Cited

U.S. PATENT DOCUMENTS

| | | |
|---|---|---|
| 2009/0161541 A1* | 6/2009 | Harhira et al. ............. 370/230.1 |
| 2010/0332617 A1 | 12/2010 | Goodwin et al. |
| 2013/0003735 A1 | 1/2013 | Chao et al. |
| 2013/0044758 A1* | 2/2013 | Nguyen et al. ................ 370/401 |
| 2013/0054817 A1 | 2/2013 | Moen et al. |
| 2013/0070762 A1 | 3/2013 | Adams et al. |
| 2013/0111467 A1 | 5/2013 | Sundararaj |
| 2013/0263256 A1* | 10/2013 | Dickinson et al. .............. 726/22 |
| 2013/0272305 A1 | 10/2013 | Lefebvre et al. |

OTHER PUBLICATIONS

Leveraging the Load Balancer to Fight DDoS SANS Institute InfoSec Reading Room Brough Davis, Kristof Boeynaems Dec. 13, 2009.*

* cited by examiner

TECHNIQUES FOR SEPARATING THE PROCESSING OF CLIENTS' TRAFFIC TO DIFFERENT ZONES

CROSS-REFERENCE TO RELATED APPLICATIONS

This application claims the benefit of U.S. provisional application No. 61/625,872 filed on Apr. 18, 2012, the contents of which are herein incorporated by reference.

TECHNICAL FIELD

This invention generally relates to techniques for protecting networks and computing resources, and for guaranteeing continuous services by such resources.

BACKGROUND

A significant problem facing the Internet community is that on-line businesses and organizations are vulnerable to malicious attacks. Recently, attacks have been committed using a wide arsenal of attack techniques and tools targeting both the information maintained by the on-line businesses and their IT infrastructure. Hackers and attackers are constantly trying to improve their attacks to cause irrecoverable damage, overcome currently deployed protection mechanisms, and so on.

Attacks and attack attempts are executed against servers and clients at different layers (e.g., a network layer and an application layer). Attacks have become more sophisticated and their scope has also been increased. That is, a multitude number of infected machines and groups of organized attackers take part in coordinated attack campaigns. Thus, it has become a significant challenge to secure online businesses and organizations against targeted attack campaigns.

As a result, organizations and businesses loose revenue due to security-related downtime, information theft, and the compromise of confidential information. Consequently, the organizations and businesses suffer immeasurable damage to their brand and image. In many cases, even after the attack has stopped, the remediation process can be a long and expensive process. That is, it may take a long time to restore the services/applications provided by the attacked site back to functioning properly.

Currently available security systems cannot guarantee full protection against a vast number of cyber threat categories and the numerous number of attack vectors that exist to execute such threats. As a result, when a site is under attack, a portion of the site or the entire site may be idle, and legitimate clients cannot access the servers of the site, or they experience a very low service response time (high latency).

Examples for cyber attacks include, denial-of-service (DoS) and intrusion types of attacks. An intrusion type of attack is typically performed by injecting a malware code into servers in the site. The malware code is often downloaded by a legitimate client and can be used against him in couple of ways. For example, the malware can be used to expose the client's confidential information and/or used to take control over the client's computer to perform other malicious activities. Other types of cyber attacks include buffer overflow attacks, misuse of computing resources, and the like. Types of (web directed) attacks include, for example, web defacement attacks, cross site scripting attacks, and so on.

Although there are various security systems designed to detect, prevent, or mitigate cyber attacks, there is no security system that can fully guarantee that such attacks will not succeed in negatively impacting the sites' services, and that clients of the site will not be affected. Thus, when a site is under attack, there is always a chance that the Quality of Service (QoS) will be compromised and the service-level agreement (SLA) cannot be guaranteed to the site's users.

It would therefore be advantageous to provide an efficient solution that would ensure the guaranteed SLA to the site's trusted clients even when the site is under attack and even though some of the security systems cannot guarantee the detection and prevention of the attacks against the site.

SUMMARY

Certain embodiments disclosed herein include a method for separation of traffic processing in a computing farm. The method comprises allocating a first group of computing resources of the computing farm to a trusted zone and a second group of computing resources to an un-trusted zone, wherein the computing resources in the first group are allocated to ensure at least service-level agreements (SLA) guaranteed to a group of trusted clients; determining, based on a plurality of security risk indication parameters, if a client associated with an incoming traffic is a trusted client or an un-trusted client; forwarding the incoming traffic to the second group of computing resources when the client is determined to be an un-trusted client; and diverting the incoming traffic to the first group of computing resources when the client is determined to be a trusted client, thereby ensuring at least the SLA guaranteed to the trusted client.

Certain embodiments disclosed herein also include a load balancing appliance configured to separate traffic processing in a computing farm. The method comprises an external system interface configured to receive at least a plurality of security risk indication parameters and a plurality of zoning trigger parameters; a zoning module for determining if a zoning mode is required in the computing farm, wherein the zoning module is further configured to determine, based on a plurality of security risk indication parameters, if a client associated with an incoming traffic is a trusted client or an un-trusted client; and a balancer configured to forward the incoming traffic to a second group of computing resources in the computing farm when the client is determined to be an un-trusted client and divert the incoming traffic to a first group of computing resources in the computing farm when the client is determined to be a trusted client, wherein the first group of computing resources are allocated to ensure at least a service-level agreement (SLA) guaranteed to the trusted client.

Certain embodiments disclosed also herein a computing farm that comprises a first group of computing resources allocated to ensure at least service-level agreements guaranteed to a group of trusted clients; a second group of computing resources; at least one load balancing appliance connected to at least the second group of computing resources, wherein the load balancing appliance is configured to: determine based on a plurality of security risk indication parameters, if a client associated with an incoming traffic is a trusted client or an un-trusted client; forward the incoming traffic to the second group of computing resources when the client is determined to be an un-trusted client; and divert the incoming traffic to the first group of computing resources when the client is determined to a trusted client, thereby ensuring at least a service-level agreement (SLA) guaranteed to the trusted client.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
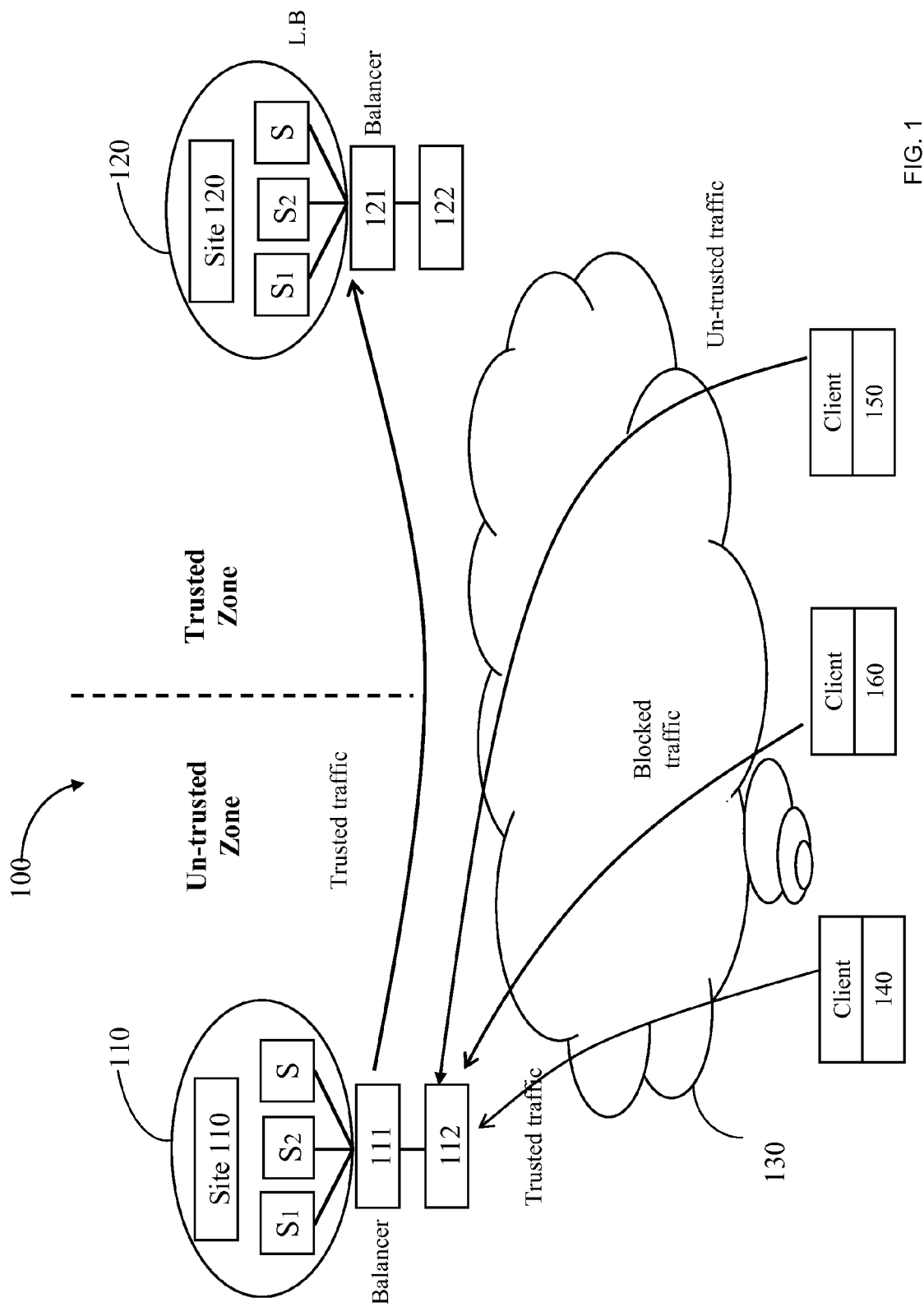
FIG. 1 illustrates a network system utilized to describe the separated processing of trusted and un-trusted traffic according to one embodiment.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow distinguishing between trusted and un-trusted clients accessing a site. An un-trusted client can be an anonymous client of whose history, legitimacy, reputation, and/or identity is unknown. There is a higher probability that an un-trusted client would perform attack activities against the site. A trusted client is a client having an identity and/or reputation that is known as legitimate in all regards as to utilization of the services provided by the site. A site includes a plurality of servers that provide services to the clients. The site may be part of a global computing farm located in distributed geographical locations, a local server farm, or a combination thereof.

According to certain embodiments disclosed herein, a determination is made if the site should be transferred to a zoning mode. In one embodiment, the site is switched to a zoning mode during an attack or during a period of time when the site is considered to be under high risk to be a target of a cyber attack. The cyber attack can be any type of known and unknown attack including, for example, DoS, Distributed DoS (DDoS), intrusion attack, web defacement, cross site scripting, buffer overflow, misuse of computing resources, and the like.

In the zoning mode, the computing resources of the site are dynamically allocated and separated to a trusted zone and an un-trusted zone. The computing resources in the trusted zone are selected to ensure high SLA to trusted clients based, in part, on pre-defined and/or previously learned service usage characteristics.

Traffic from trusted clients is routed to the trusted zone, for processing therein. Traffic from un-trusted clients is not processed in the trusted zone, thus enabling delivery of a higher security SLA, availability, and better user experience to trusted clients. To this end, traffic from all clients is continuously monitored, and based on a plurality of parameters described in detail below, it is determined if a client is trusted or un-trusted. In addition, a plurality of parameters is evaluated to determine if the site should be switched to a zoning mode.

FIG. 1 shows an exemplary diagram of a network system that includes a global computing (server) farm 100 utilized to describe various embodiments. The exemplary global computing farm 100 includes two sites 110 and 120 connected through a network 130. As shown in FIG. 1, each of the sites 110 and 120 includes a plurality of servers ($S_1$, $S_2$, and $S_N$) and a load balancer (111, 121). In an optional configuration, each of the load balancers 111 and 121 may be respectively connected to a security engine (112, 122). A security engine is configured to detect and mitigate malicious attacks that may be performed by any of clients 140, 150, and 160. Each of the load balancers 111 and 121 may be an application delivery controller (ADC). The sites 110 and 120 may be geographically distributed. Each load balancer 111 and 121, in addition to the functionalities described in detail below, typically distributes clients' traffic among servers in a server farm to balance the load. The load balancing traffic distribution rules are typically based on the availability of the servers (health), the load on the servers, and other parameters such as the application persistency rules, global load balancing, and so on. Each load balancer 111 and 121 may be a physical device that executes virtual instances of load balancers or ADCs.

For the sake of simplicity only two sites 110 and 120, and three clients 140, 150 and 160 are shown in FIG. 1. However, the embodiments disclosed herein can be applied to any number of clients and sites. The clients may be located in different geographical locations. The sites may be a datacenter, a server farm, a cloud-based computing system, or combinations thereof. According to one embodiment, each of sites 110 and 120 is designed to deliver an SLA including, but not limited to, a security and availability SLA guaranteed to each of the clients 140, 150, and 160. For the sake of simplicity and without limiting the scope of the disclosed embodiment, the site 110 is selected to be in an un-trusted zone while the site 120 is defined as a trusted zone.

Primarily, traffic from clients 140, 150, and 160 is directed to the load balancer 111 of the site 110. The load balancer 111 is configured with and continuously receives, for example, through its application programming interface (APIs), security risk indication parameters. Based on these parameters the load balancer 111 computes a threat level value for each of the clients accessing the site 110. In an embodiment, the computed threat level value allows determining if a client is trusted or un-trusted.

The security risk indication parameters include at least one of: a pre-complied list of trusted clients per IP address, a reputation score per IP address or geographical region, application layer parameters (e.g., clients' cookies), a client unique identification (ID) token, user ID, an affiliation of a client (e.g., a client belongs to a trusted company or is an internal client of the organization), parameters collected from external and internal client authentication services (e.g., "call-back" procedure, etc.), geo analysis (e.g., the origin of a client's traffic in comparison to other clients), a type of content and/or application accessed by the client, behavioral analysis (e.g., comparing the clients' behavior to a normal behavior of the client), and so on. Some of the above-listed security risk indication parameters can be received from external resources, such as reputation services servers, Firewalls, VPNs, Radius servers, LDAP servers, databases, external API feeds, and the like.

The load balancer 111 further receives, for example, through its APIs one or more zoning trigger parameters that provide an indication as to whether the load balancer 111 should switch to a zoning mode. That is, a zoning trigger parameter can indicate a potential risk that an attack is about to take place against the site 110 or that the site 110 is currently under attack. The zone trigger parameter(s) can be received from the security engine 112 or from any other external source, such as, but not limited to, a network security manager, reputation services servers, or media outlets (e.g., if the site name is mentioned in online media as a target of cyber attack groups).

A zone trigger parameter may be also a predefined rule. For example, such a rule may be a predefined time window (e.g., a certain date, time in a day, or day in a week), geographical-location of the source traffic, a predefined pattern of content in the incoming traffic, or traffic directed to a certain service (e.g., traffic to a finance application).

In one embodiment, the zoning trigger parameters may be configured in a proactive policy saved in the load balancer 111. One or more proactive policies can be implemented in situations where there is a high risk condition for a cyber attack, even before such an attack occurs. For example, activation of the trusted and un-trusted zones when a warning about a possible attack has been raised, at a certain hour in a day, during a holiday vacation when most of the information technology (IT) team is not present at the site, or in response to a specific event to which attackers may react by attacking the site. In another embodiment, the zone trigger parameter may be an external trigger from a user (e.g., a system administrator or a network security manager), and so on. The load balancer 111 determines based on one or more of the zoning trigger parameters if the site should switch to a zoning mode. That is, if trusted and un-trusted zones should be created and if traffic should be diverted to these zones. In another embodiment, the switching to a zoning mode is based on one or more proactive policies and zoning trigger parameters defined therein.

As mentioned above, a threat level value is computed for each client 140, 150, 160 based on one or more of the security risk indication parameters. This value may be a binary value, a color-coded value (e.g., red, green and yellow), or any numerical value that can be utilized to determine if the client should be treated as a trusted or un-trusted client. The computation of the threat level value may include, in an exemplary embodiment, assigning a score to each risk indication parameter. This allows providing a certain weight to certain parameters, for example, based the relevancy of a certain parameter to a client. Then, the threat level value can be computed based on the parameters' scores of the client. The computation of the threat level value may be, for example, an average or weighted average of the scores. A computed threat level value may be compared to a predefined threshold to determine if the client is a trusted client. The threat level may be set to a value indicating that the client should be labeled as trusted based on a single predefined parameter. For example, if the client's IP is in a pre-compiled list of trusted IP addresses, then the value may be set to indicate that the client should be labeled as trusted.

After the load balancer 111 determines the type of the client (trusted or un-trusted), and when the site 110 operates in a zoning mode, the load balancer 111 diverts the traffic from the client to the zone assigned to the client. Specifically, if the client is determined to be trusted, then its traffic is diverted to the trusted zone to be processed therein. On the other hand, traffic from a client determined to be un-trusted is forwarded to the un-trusted zone.

As illustrated in FIG. 1, the client 140 is a trusted client, thus traffic originating from the client 140 is forwarded, by the load balancer 111, to the site 120 which is in the trusted zone. The client 150 is an un-trusted client, thus its traffic is processed by the site 110 which is in the un-trusted zone. The site 110 can process the traffic to mitigate any attack executed by the client 150. The site 110 may also collect information about the behavior of the client 150 in order to learn the type of the attack being performed in case an attack is actually executed. Such forensics information can be shared with a security organization (SOC) and/or utilized to develop counter attacks or new mitigation techniques. As the site 120 processes only traffic that originates in trusted clients, the SLA can be guaranteed to the client 140 as the site 120 will be less likely impacted by an ongoing attack.

In one embodiment, the site 120 is a replica of the site 110 (i.e., includes the same computing resources and service content as in the site 110) which has been designed to efficiently support all clients (trusted and un-trusted) that access the site 110. Thus, the site 120 can efficiently support and provide the guaranteed SLA to a sub set of clients (only trusted clients). In another embodiment, only a set of servers in the site 120 can be pre-allocated to process traffic of trusted clients diverted by the load balancer 111, where additional servers may be added ah-hoc based on the volume of traffic.

According to another embodiment, a set of servers in the site 110 may be configured as a trusted zone while the other servers are in the un-trusted zone (e.g., servers $S_1$ and $S_2$ are allocated to the trusted zone and $S_N$ is allocated to the un-trusted zone). The servers in the "trusted zone" process traffic only from trusted clients. In addition, the site 120 may be utilized to process traffic of trusted clients as well. Traffic from trusted clients can be load-balanced among the servers allocated to the trusted zone in the sites 110 and 120 based, in part, on global load balancing criteria. Such criteria include, but are not limited to, proximity between a client and site, latency, cost, and so on.

In the deployment shown in FIG. 1, traffic from certain clients can be blocked by the security engine 112. Typically, traffic from a client (e.g., client 160) that has been identified as an attack is blocked and not forwarded to processing by either of sites 110 or 120.

Figure 2:
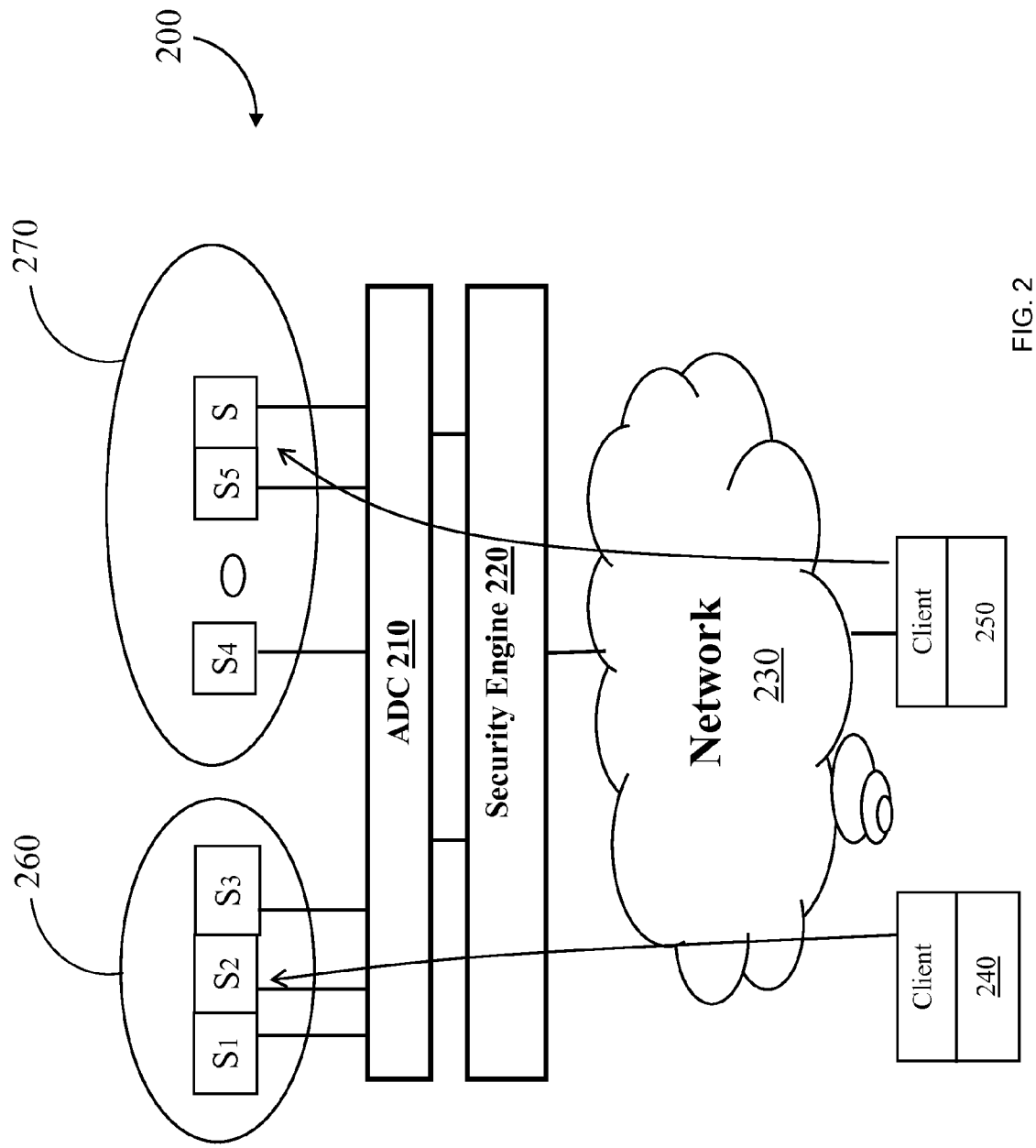
FIG. 2 illustrates a network system utilized to describe the separated processing of trusted and un-trusted traffic according to another embodiment.

FIG. 2 shows an exemplary diagram of a network system including a local computing farm 200 utilized to describe another embodiment. The local computing (server) farm 200 includes an application delivery appliance (ADC) 210 connected to a number of N servers $S_1$ through $S_N$. In one configuration, the ADC 210 is also connected to a security engine 220. The farm 200 provides services to clients 240 and 250, which communicate with the ADC 210 through a network 230. The network 230 may be a WAN, the Internet, a LAN, or a combination thereof. An ADC is a network appliance that is installed in a computing farm (or datacenter) to remove a load from the servers in the farm. An ADC typically distributes clients' traffic between the servers in a farm to balance the load. The ADC traffic distribution rules are typically based on the availability of the servers (health), the load on the servers, and other parameters such as the application persistency rules, and so on. The ADC 210 may be a physical device that executes virtual instances of ADCs. The local computing farm 200 may be a datacenter.

According to this embodiment, the ADC 210 is configured with and continuously receives security risk indication parameters. Using these parameters, the ADC 210 computes a threat level value for each client, as discussed in detail above. Primarily, traffic from both clients 240 and 250 is distributed among all the active servers $S_1$ to $S_N$. The traffic is monitored and the client threat level is computed. When the local farm 200 switches to a zoning mode (based in part on the zoning trigger parameters described above), trusted and un-trusted zones 260 and 270 respectively are created in the farm 200. The determination if a client is trusted or un-trusted is described above.

The trusted zone 260 and un-trusted zone 270 include a set of servers $S_1$ to $S_N$. For example, the trusted zone 260 includes the servers $S_1$, $S_2$, and $S_3$, while the un-trusted zone 270 includes severs $S_4$ through $S_N$. Each group of servers in the respective zone is assigned with a different virtual IP (VIP) address. For example, servers in the zone 270 are assigned with an address VIP1 while servers in the zone 260 are assigned with the address VIP2. In another embodiment, only one VIP address is assigned to both zones.

Accordingly, all clients send their traffic to this VIP address and the ADC 210 routes traffic from trusted clients to the trusted zone 260 and traffic from un-trusted clients to the un-trusted zone 270. In one embodiment, the ADC 210 is configured with the servers that should be included in each zone. In another embodiment, the ADC 210 dynamically and in real-time selects the servers to be allocated to the secure zone 260. The selection is performed in such a way that trusted clients will always receive the guaranteed SLA.

In one embodiment, the allocation of servers (i.e., computing resources) to each zone is performed using a learning mechanism that generates a load profile baseline. With this aim, a load profile while in "normal" or baseline (not under attack) of the site 200 is computed. The load profile summarizes typical load characteristics of each trusted client and/or a group of trusted clients. The load profile may further register the load characteristics of different client groups originating from different locations. The load characteristics are per different times of the day, week, etc. When the site is under attack, the load profile can be used to calculate how to dynamically separate the farm 200, i.e., how many servers to allocate to the trusted zone 260 and how many servers to be assigned to the un-trusted zone 270. In one embodiment, deviation from the baseline would trigger the allocation of additional servers to the trusted zone.

In another embodiment, weights can be assigned to various allocation criteria. For example, there should be always at least five servers in the trusted zone, and per traffic characteristics, more servers are added if specific transactions and/or applications are invoked. In yet another embodiment, the farm 200 may include a group of dedicated servers that are provisioned and used only at the zoning mode of the site. Thus, when the farm 200 operates in a zoning mode, the capacity of the farm is increased. In an embodiment that can be utilized herein, each server in the farm 200 is assigned with a SLA number that indicates which group of clients the server can serve. If a server is assigned with a SLA number that correlates to trusted clients, then this server can process only traffic received from trusted clients. The assigned SLA numbers can be dynamically changed. Allocation of servers to the trusted zone may also include assigning a new VIP address to such servers and performing graceful termination of computed sessions executed therein.

Once the trusted and un-trusted zones have been established, the ADC 210 forwards traffic from clients determined to be trusted (e.g., client 240) to the servers in the trusted zone 260. In addition, traffic from clients determined to be un-trusted (e.g., client 250) is forwarded to the servers in un-trusted zone 270. Traffic in each zone can be load balanced among the servers in the zone by the ADC 210.

As mentioned above, because the trusted zone 260 processes only traffic that originates in trusted clients, the SLA can be guaranteed to the client 240 because the servers in the trusted zone 260 will be less likely to be impacted by an attack. In one embodiment, the ADC 210 monitors the resources utilized to process traffic from trusted clients and determines if more resources (i.e., servers) should be allocated to the trusted zone 260 to ensure the SLA to trusted clients.

Figure 3:
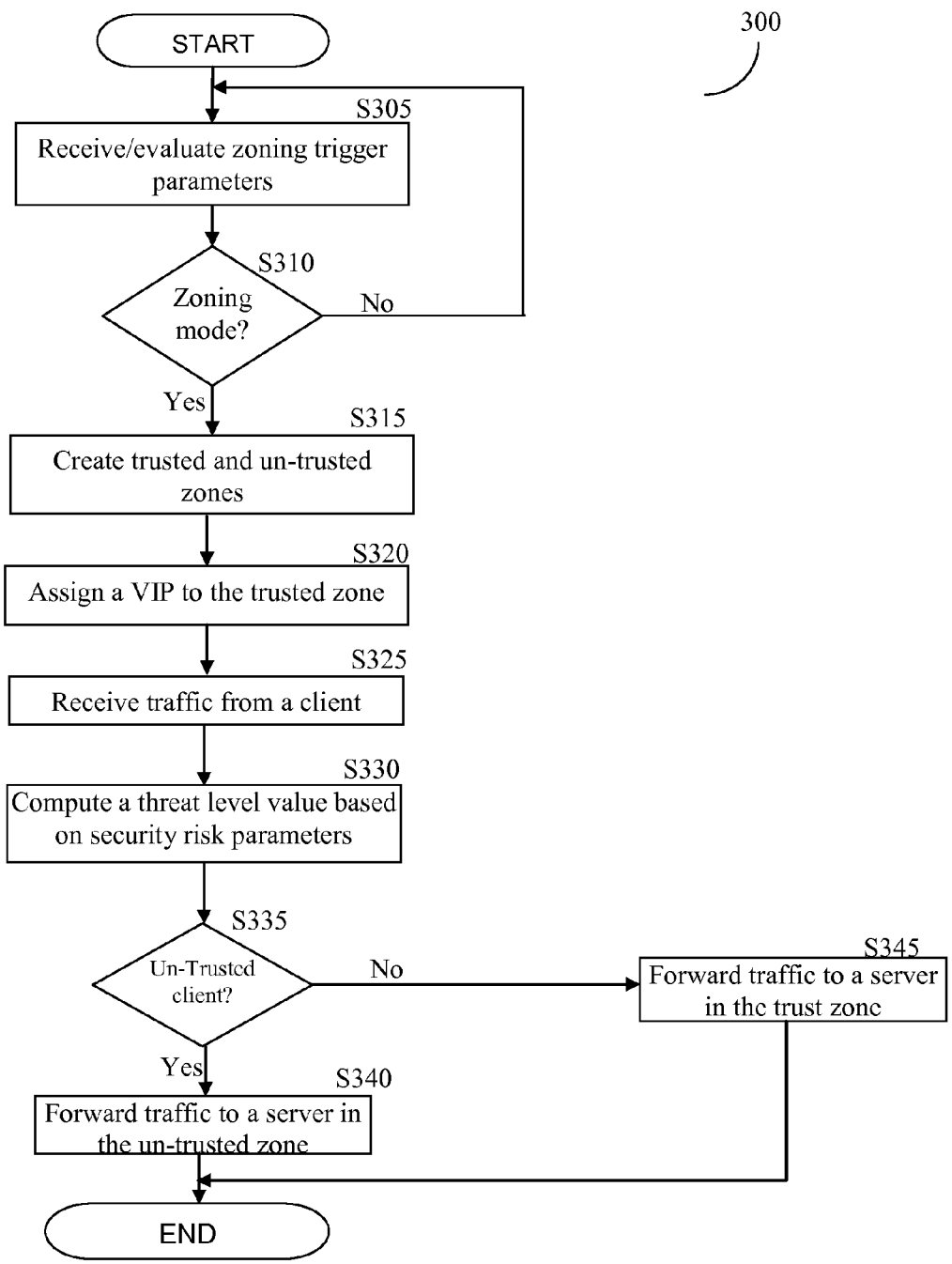
FIG. 3 is a flowchart describing a method for separating the processing of trusted and un-trusted traffic according to one embodiment.

FIG. 3 shows an exemplary and non-limiting flowchart 300 illustrating a method for separating the processing of traffic received from clients. The method will be described with reference to the local computing farm 200, but it should be apparent that the method is also applicable to the global computing farm 100. It should be noted that the method is described with reference to an embodiment where the traffic is diverted to trusted zone. However, the teachings disclosed herein are also applicable to diver un-trusted traffic to a trusted zone.

At S305, a plurality of zoning trigger parameters is received at the ADC 210 to determine if the farm 200 should switch to a zoning mode. In certain embodiments, some of the zoning trigger parameters may also be pre-configured with the ADC 210. A detailed discussion of the zoning trigger parameters is provided above. At S310, based on one or more of the received zoning trigger parameters, it is determined if the farm 200 should operate in a zoning mode. If so, execution continues with S315; otherwise, execution returns to S305 where new zoning trigger parameters may be received and evaluated. It should be noted that while the farm is not in the zoning mode, the ADC 210 routes traffic according its standard load balancing schema.

At S315, trusted and un-trusted zones are created by allocating servers of the farm 200 to each zone. Various embodiments for allocating sufficient resources to each zone are discussed in detail above. At S320, servers allocated to the trusted zone are allocated with an address representing the trusted group, e.g., a VIP address different than the servers in the un-trusted zone group.

At S325, incoming traffic from a client (e.g., client 250) of the server 200 is received at the ADC 210. At S330, a threat level value is computed for the client based on one or more security risk indication parameters discussed in detail above.

At S335, it is determined if the threat level value provides an indication that the client (e.g., client 250) is an un-trusted client; and if so, execution continues with S340; otherwise, execution proceeds to S345 where the traffic is forwarded to one of the servers in the trusted zone according to the load balancing schema of the ADC 210. The determination at S335 may be performed based on a predefined threshold related to the computed threat level value or a binary value associated with the threat level value. For example, if the risk indication parameters include a list of trusted client, then the threat level value for client designated in the list is set '0' indicating a binary value of a trusted client. In another embodiment, the threat level value is color-coded, thus the determination is based on its color (e.g., red is an un-trusted client). At S340, the traffic from the client (determined to be un-trusted) is forwarded to one or more servers in the un-trusted zone (e.g., zone 270) for processing therein.

It should be noted that once the trusted and un-trusted zones are established, traffic from trusted clients is forwarded to the trusted zone, while traffic from un-trusted clients is forwarded to the un-trusted zone. As mentioned above, additional servers may be added to the trusted zone, as needed, to ensure high SLA and performance to trusted clients. In an embodiment, the classification of clients to trusted and un-trusted zones can also be performed when the farm (or site) does not operate in the zoning mode.

It should be noted that in the embodiments discussed above, the traffic may be of protocols that allow redirection of traffic in the application layer (e.g., HTTP, SIP) and protocols that do not allow redirection (e.g., SMTP, UDP etc). It should be further noted that the embodiments disclosed herein allow processing of traffic from all clients in the site, regardless of being trusted and un-trusted, thus there is no false positive related to blocking of legitimate traffic.

Figure 4:
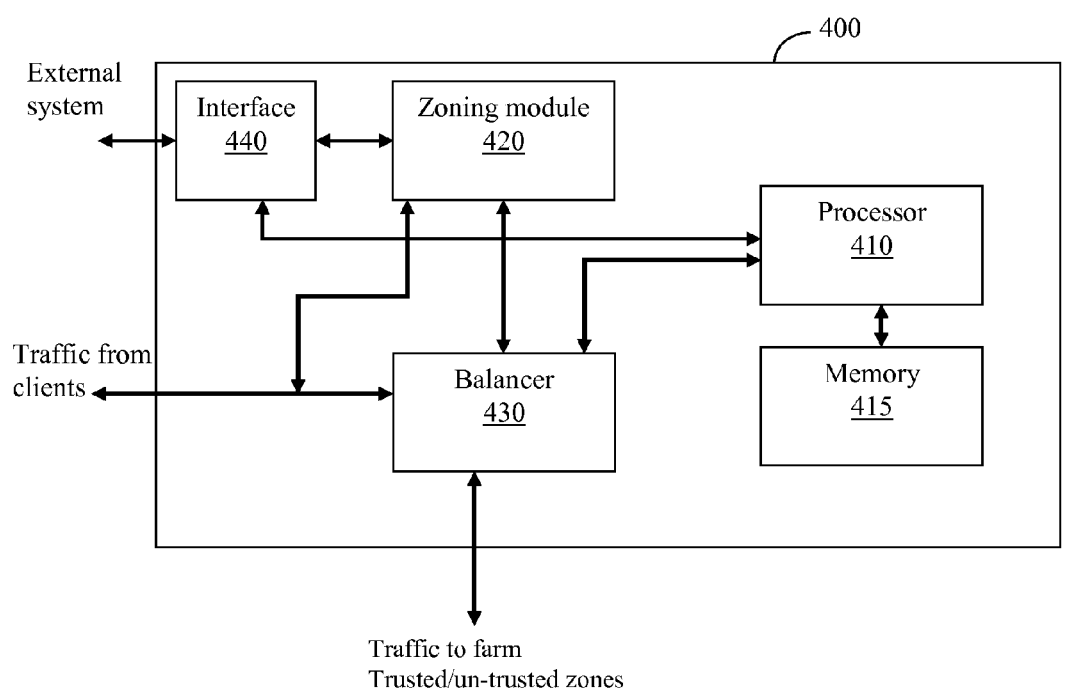
FIG. 4 is a block diagram of a load balancing appliance constructed according to one embodiment.

FIG. 4 shows an exemplary and non-limiting block diagram of a load balancing appliance 400 constructed according to one embodiment. The load balancing appliance 400 includes a processor 410 coupled to a memory 415, a zoning module 420, a balancer 430, and an interface 440 connected to an external system.

The interface 440 provides an interface to an external system, such as but not limited to, an attack detection device, a security management system, and the like. In one embodiment, the interface 440 provides APIs to the external system through which the plurality of the security risk indication parameters and the trigger zoning parameters are received.

The zoning module 420 is configured to determine if a zoning mode should be applied. In addition, the zoning module 420 computes a threat level value for a client accessing the computing farm to determine if the client is trusted or un-trusted. The balancer 430 directs the traffic to different zones responsive of an input from the zoning model with regard to the type of client the traffic is received from (i.e., trusted or un-trusted). The balancer 430 can also balance traffic among servers in each zone (when operating in a zoning mode) or among servers in the entire farm according to a load balancing schema. The processor 410 uses instructions stored in the memory 415 to execute tasks traditionally performed by the load balancing appliance and optionally for execution of the tasks performed by the modules 420, 430 and 440. The load balancing appliance 400 may be, but is not limited to, a load balancer, an ADC, a virtual ADC, and the like. The load balancing appliance 400 in another embodiment includes a combination of application specific integrated circuits and processors. In a further embodiment the load balancing appliance 400 is distributed across several devices and processors.

The foregoing detailed description has set forth a few of the many forms that different embodiments of the invention can take. It is intended that the foregoing detailed description be understood as an illustration of selected forms that the invention can take and not as a limitation to the definition of the invention.

Most preferably, the various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for separation of traffic processing in a computing farm, the method is performed by a system, comprising:
   allocating a first group of computing resources of the computing farm to a trusted zone and a second group of computing resources to an un-trusted zone, wherein the computing resources in the first group are dynamically allocated based on at least one service-level agreement (SLA) guaranteed to a group of trusted clients;
   determining, based on a plurality of security risk indication parameters, if a client associated with an incoming traffic is a trusted client or an un-trusted client;
   forwarding the incoming traffic to the second group of computing resources when the client is determined to be an un-trusted client; and
   diverting the incoming traffic to the first group of computing resources when the client is determined to be a trusted client, thereby ensuring the at least one SLA guaranteed to the trusted client.

2. The method of claim 1, wherein diversion of the incoming traffic to the first group of computing resources is performed when the computing farm operates in a zoning mode.

3. The method of claim 2, further comprising:
   determining based on at least one zoning trigger parameter if the computing farm should operate in the zoning mode.

4. The method of claim 3, wherein the at least one zoning trigger parameter indicates that a potential cyber attack is currently being performed or is about to be performed against the computing farm.

5. The method of claim 4, wherein the at least one zoning trigger parameter is a predefined rule, wherein the predefined rule is defined in a proactive protection policy.

6. The method of claim 4, wherein the at least one zoning trigger parameter is received from an external system, wherein the external system includes at least one of: a network security manager, a reputation services server, an external API, and a media outlet.

7. The method of claim 1, wherein each of the plurality of security risk indication parameters includes at least one of: a pre-complied list of trusted internet protocol (IP) addresses per client, a pre-complied list of trusted internet protocol (IP) addresses per group of clients, a reputation score per IP address, a reputation score per geographical region, an application layer parameter, a client unique identification (ID) token, a user ID, a client affiliation, an authentication parameter, a geo analysis indication, a type of content accessed by the client associated with the incoming traffic, an application accessed by the client associated with the incoming traffic, and a behavioral analysis indication.

8. The method of claim 1, wherein determining if the client associated with the incoming traffic is a trusted client or an un-trusted client, further comprising:
   computing a threat level value for the client using the plurality of security risk indication parameters;
   comparing the computed threat level value to a predefined threshold;
   determining the client to be an un-trusted client if the computed threat level value exceeds the predefined threshold; and
   determining the client to be a trusted client if the computed threat level value does not exceed the predefined threshold.

9. The method of claim 8, wherein computing the threat level value further comprising:
assigning a score to each security risk indication parameter, wherein each respective score determines relevancy of a parameter to the client; and
calculating the threat level value as an average of scores assigned to each security risk indication parameter.

10. The method of claim 2, wherein allocating the first group of computing resources includes provisioning a group of dedicated computing resources to serve trusted clients in the zoning mode.

11. The method of claim 1, wherein allocating the first group of computing resources includes:
dynamically allocating computing resources to the first group based on typical load characteristics of trusted clients, wherein the typical load characteristics are determined based on a load profile baseline.

12. The method of claim 11, wherein computing resources are dynamically allocated to the first group based on a current load on the computing resources in the first group.

13. The method of claim 1, wherein the first group of computing resources and the second group of computing resources are geographically distributed.

14. The method of claim 1, wherein the first group of computing resources and the second group of computing resources are resources of a local computing farm.

15. The method of claim 1, further comprising:
load balancing the incoming traffic among any one of the first group of computing resources and the second group of computing resources.

16. The method of claim 1, wherein the system is at least a load balancing appliance communicatively connected to the clients.

17. The method of claim 1, wherein each of the first group of computing resources and the second group of computing resources is addressed by a different address, wherein the incoming traffic is always addressed by the client to the second group of computing resources.

18. The method of claim 1, further comprising:
detecting a cyber attack performed by any client sending the incoming traffic; and
mitigating the cyber attack by a security engine communicatively connected to the computing farm.

19. A computer software product embedded in a non-transient computer readable medium containing instructions that when executed on a computer perform the method of claim 1.

20. A load balancing appliance configured to separate traffic processing in a computing farm, comprising:
an external system interface configured to receive at least a plurality of security risk indication parameters and a plurality of zoning trigger parameters;
a zoning module for determining if a zoning mode is required in the computing farm, wherein the zoning module is further configured to determine, based on the at least a plurality of security risk indication parameters, if a client associated with an incoming traffic is a trusted client or an un-trusted client; and
a balancer configured to forward the incoming traffic to a second group of computing resources in the computing farm when the client is determined to be an un-trusted client and to divert the incoming traffic to a first group of computing resources in the computing farm when the client is determined to be a trusted client, wherein the first group of computing resources are dynamically allocated based on at least one service-level agreement (SLA) guaranteed to the trusted client.

21. The load balancing appliance of claim 20, wherein the zoning mode is determined to be required when a potential cyber attack is currently being performed or is about to be performed against the computing farm.

22. A computing farm, comprising:
a first group of computing resources dynamically allocated based on at least one service-level agreement (SLA) guaranteed to a group of trusted clients;
a second group of computing resources;
at least one load balancing appliance connected to at least the second group of computing resources, wherein the load balancing appliance is configured to:
determine, based on a plurality of security risk indication parameters, if a client associated with an incoming traffic is a trusted client or an un-trusted client;
forward the incoming traffic to the second group of computing resources when the client is determined to be an un-trusted client; and
divert the incoming traffic to the first group of computing resources when the client is determined to be a trusted client, thereby ensuring at least one service-level agreement (SLA) guaranteed to the trusted client.

23. The computing farm of claim 22, wherein the diversion of incoming traffic to the first group of computing resources is performed when the computing farm operates in a zoning mode.

24. The computing farm of claim 23, wherein the load balancing appliance is further configured to determine based on at least one zoning trigger parameter if the computing farm should operate in the zoning mode.

25. The computing farm of claim 24, wherein the at least one zoning trigger parameter indicates that a potential cyber attack is currently being performed or is about to be performed against the computing farm.

* * * * *